United States Patent [19]
Mount

[11] Patent Number: 5,469,184
[45] Date of Patent: * Nov. 21, 1995

[54] DIRECTLY VIEWABLE SPEED DISPLAY SYSTEM

[76] Inventor: Wilbur S. Mount, 5806 College Creek Pl., Williamsburg, Va. 23158

[ * ] Notice: The portion of the term of this patent subsequent to Jun. 14, 2011, has been disclaimed.

[21] Appl. No.: 240,899

[22] Filed: May 11, 1994

Related U.S. Application Data

[63] Continuation-in-part of Ser. No. 685,071, Apr. 15, 1991, Pat. No. 5,321,415.

[51] Int. Cl.⁶ ............................... G09G 3/00; B60Q 1/00
[52] U.S. Cl. ................. 345/7; 340/441; 340/980
[58] Field of Search .................. 345/7; 340/441, 340/977, 978, 980

[56] References Cited

U.S. PATENT DOCUMENTS

| | | |
|---|---|---|
| 3,125,985 | 3/1964 | Nallinger . |
| 3,317,906 | 5/1967 | Baldridge . |
| 3,694,084 | 9/1972 | Citron . |
| 3,899,241 | 8/1975 | Malobicky, Jr. et al. . |
| 4,229,727 | 10/1980 | Gilhooley ............................ 340/441 |
| 4,251,769 | 2/1981 | Ewert et al. . |
| 4,646,059 | 2/1987 | Iwamoto et al. . |
| 4,688,029 | 8/1987 | Kawasaki et al. . |
| 4,853,673 | 8/1989 | Kido et al. ............................ 340/441 |
| 5,321,415 | 6/1994 | Mount ...................................... 345/7 |

*Primary Examiner*—Jeffery Brier
*Attorney, Agent, or Firm*—Stevens, Davis, Miller & Mosher

[57] ABSTRACT

A directly viewable speed display device for vehicles is located within the visual field of an operator of the vehicle. The display device uses a light illumination source such as a lamp, light emitting diode or exit ends of light guides to denote the actual vehicle speed which can be compared to an illuminated scale. In its simplest form, the illuminated scale can be a single point of light and the light illumination source can also be a single point of light.

14 Claims, 2 Drawing Sheets

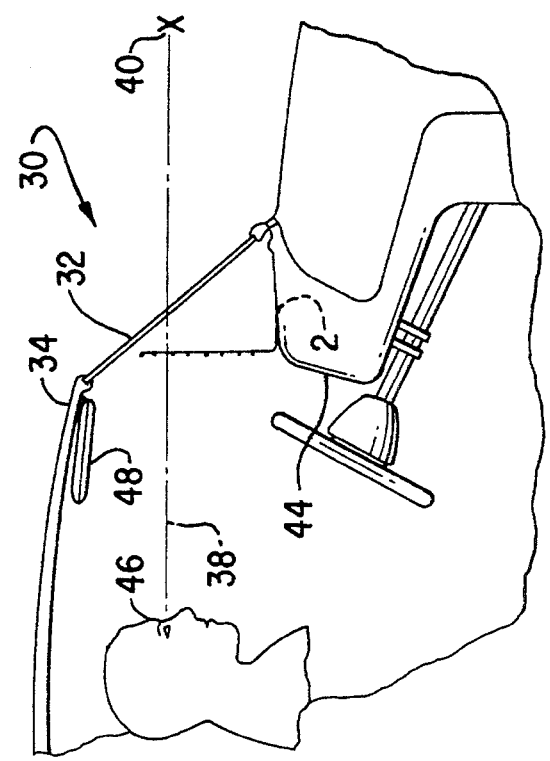
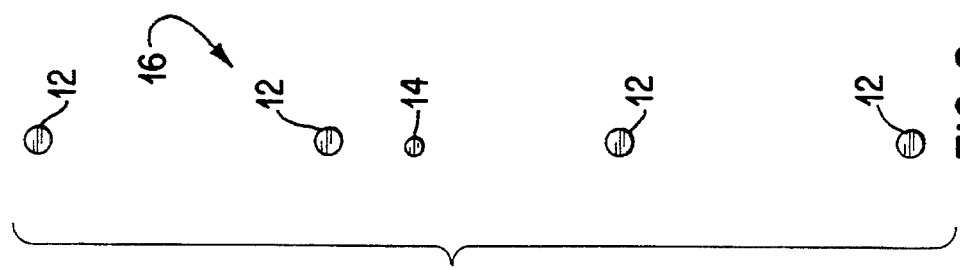
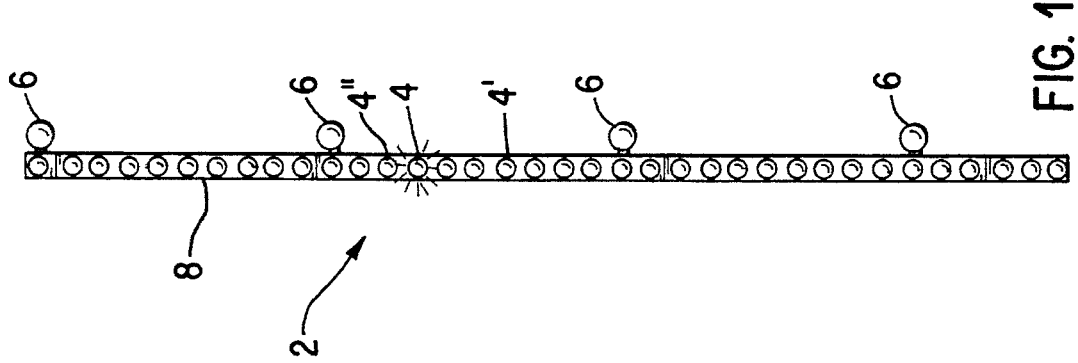

DIRECTLY VIEWABLE SPEED DISPLAY SYSTEM

CROSS-REFERENCE TO RELATED APPLICATIONS

This application is a continuation-in-part of my earlier application Ser. No. 07/685,071, filed Apr. 15, 1991, now U.S. Pat. No. 5,321,415, the entire disclosure of which is herein incorporated by reference.

BACKGROUND OF THE INVENTION

1. Field of the Invention

The present invention relates to a display device for vehicles which is located within the visual field of an operator of the vehicle, preferably within the operator's compartment. By use of the display device of the invention, the driver of the vehicle can accurately and unambiguously determine a variable, e.g., the speed, of the vehicle from the display device. The vehicles to which the display device can be fitted include land, sea, air and space vehicles but the invention is especially suited to land vehicles such as motor vehicles.

2. Description of related art

U.S. Pat. No. 3,694,084 to Citron is directed to a relative speed indicating means and more particularly to a visual display system for enabling an abstract visual comparison of the relative speed of one moving vehicle with respect to another and further to means capable of presenting an abstract visual display to the operator of a moving vehicle of the required desirable vehicle speed, the latter presentation being dictated remotely from a fixed station to the operator from means within the vehicle. In the particularly disclosed embodiment Citron employs, a stroboscopic perception phenomenon.

A Business Week article entitled *G. M. and Hughes: Is the Marriage Fizzling!*, of Feb. 12, 1990 discloses a fighter type "heads up display" that projects numerals indicating a motor vehicle's speed on the windshield of some Oldsmobile and Pontiac automobile models.

By contrast, my earlier application disclosed a projected display system whereby the necessity of an operator to refocus his eyes from the roadway to the speed indicating means was obviated. In such a projected display system, a point or points of light comprising a speed scale were projected onto a screen, for example, the windshield of a motor vehicle, and a discrete light indicating the actual speed of the vehicle was also projected onto the screen, so that the operator, by comparison of the location of the discrete light indicating the actual speed of the vehicle, to the point or points of light comprising the speed scale, could determine the actual speed of the vehicle, while maintaining customary driving eye focus, or by a quick glance slightly to the side of the line of vision.

The present invention presents a display system which is positioned so as to be directly viewable by an operator of a vehicle without the necessity to refocus the operator's eyes from the customary line of sight necessary to operate the vehicle thereby obviating the need for a projection mechanism. In the disclosed embodiments, interference with forward vision of the operator is minimized.

OBJECT OF THE INVENTION

The purpose of this invention is to provide an alternative display system for a vehicle which does require the projection mechanism disclosed in my earlier patent application Ser. No. 07/685,071, filed Apr. 15, 1991.

As with my earlier patent application Ser. No. 07/685,071, filed Apr. 15, 1991, the purpose of the instant invention is to provide a method and apparatus whereby a sighted operator of a vehicle can determine a variable speed of the vehicle, e.g., the actual speed of the vehicle, without changing the operator's focus point from the customary path of the vehicle, e.g., line of sight to a roadway, to a conventional speedometer or other variable indicating display customarily located in a dashboard of a motor vehicle.

More particularly, it is an object of the invention to provide a method and apparatus for reducing eye fatigue of operators of vehicles, such as a driver of a motor vehicle, such as is caused by repetition of changing the driver's eye focus from the roadway to a dashboard speedometer and back from the speedometer to the roadway.

Still further, it is an object of the present invention to provide a visual display system whereby the safety in operating a motor vehicle is improved.

These and other objects of the invention will be more readily understood by the following disclosure of the invention. For ease of explanation, the following description of the invention will be made in conjunction with the operation of a motor vehicle, such as an automobile, but it is to be expressly understood that the invention is not so limited and may be combined with any operated vehicle, including water, land, air and space vehicles. Further, the illustrated variable to be monitored is speed, but it is to be expressly understood that the invention is not limited and other variables, e.g., temperature or pressure, can be monitored through the use of the invention.

SUMMARY OF THE INVENTION

A speed display system for use in a vehicle, intended to be operated by a sighted human operator, said operator having an optical focus point which is changeable, said display system comprising:

at least one illumination device, the illumination of which represents a speed scale, at least one illumination device distinct from the first mentioned illumination device, the illumination of which represents an actual speed of the vehicle, means to cause illumination of said speed scale and said actual speed illumination devices, said illuminated speed scale and actual speed illumination devices being mounted in said vehicle so as to be directly viewable by the operator of the vehicle when the operator's optical focus point is directed towards the path of the vehicle.

In another embodiment is provided a speed display system for use in a vehicle intended to be operated by a sighted human operator, said operator having an optical focus point which is changeable, said system comprising means defining at least a single point of light indicating that the actual vehicle speed exceeds a preset speed, said means mounted within the field of vision of the operator's optical focus.

BRIEF DESCRIPTION OF THE DRAWINGS

FIG. 1 is a plan view of the optical display device illustrating a series of lamps in the optical display in one embodiment of the invention.

FIG. 2 is a view along an operator's line of sight to a roadway illustrating the visual effect of the illuminated scale and speed lamps according to one embodiment of the present invention.

FIG. 3 is a sectional side view of the inside of a vehicle containing a display device according to one embodiment of the invention.

DETAILED DESCRIPTION OF THE PREFERRED EMBODIMENTS OF THE INVENTION

Figure 5:
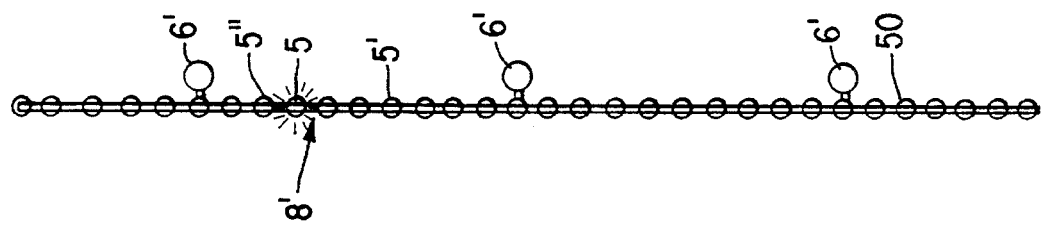
FIG. 5 is a plan view of an alternative embodiment of the optical display device of FIG. 1.

For safer driving at today's high speeds, there is a need for continuous observation of the speed of the vehicle without the diversion of attention from the operator's line of sight to the roadway forming the path of the vehicle to view the speedometer, which is usually located at a position remote from the windscreen (windshield) of the vehicle, e.g., on the dashboard. More particularly, the length of time required to change a driver's focus point from a vehicle path, e.g., a roadway, to a dashboard mounted speedometer can be considerable.

For example, if a motor vehicle were travelling at sixty miles per hour, and if a young healthy vehicle driver requires one second to change his focus point, the driver's vehicle travels 88 feet in that one second. However, if the vehicle driver is hyperopic, is middle aged or older, or if he suffers from diseases of the eye affecting focus, the length of time for these drivers to change their focus from the roadway to the speed indicator and back to the roadway can significantly increase; and in some individuals, this length of time can be as long as several seconds. If the vehicle were traveling at 60 miles an hour, an amount of only three seconds without the operator's eyes being focused on the roadway translates into 264 feet in which the vehicle has traveled while the operator's eyes are not focused on the roadway; this distance is sufficiently long that a second vehicle, an animal or a small child could have entered the vehicle's path. Additionally, the repetition of changing a person's eye focus from the roadway to the speed indicator and back to the roadway can lead to eye fatigue which may diminish the safe operation of the vehicle.

Thus, an object of the invention is to improve the safety of motor vehicles by providing an apparatus which allows the vehicle speed to be monitored without the necessity to change the eye focus of the operator from the roadway or by a quick glance at the windshield. The attainment of this objective permits a continuous or near continuous observation of the roadway with the speed image being in the field of view of the operator without diverting the operator's attention from the roadway.

Furthermore, the attempts of the prior art to provide a projection of numerals indicating motor vehicle's speed on the windshield of some Oldsmobile and Pontiac models, fail to disclose a display system which can be accurately and unambiguously viewed by the vehicle operator while glancing at the windshield while viewing the roadway ahead. Such projection systems require that the driver change his eye focus from the roadway to a specific point on or in the windshield in order to view the projected numerals of such a display system. Additionally, in order to make a display system of numerals sufficiently large to be meaningfully observed by the operator, the area of the windscreen (windshield) occupied by such displayed numerals would interfere with or, in some cases, obscure a significant part of the driver's field of view.

As shown in FIG. 1, and in one embodiment of the invention, as shown mounted in operator compartment 30 of a motor vehicle, vertically adjacent to a lower periphery of windshield 32 in FIG. 3, is an optical speed display assembly 2. As is conventional, the windshield 32 may be mounted at an angle with respect to the line of sight 38 of the operator to the roadway in front of the vehicle. In one embodiment, the speed indicating assembly 8 is an elongate member shaped generally rectangularly, and the assembly 8 comprises a series of lamps 4, which are mounted and aligned in a column along the longitudinal direction of assembly 8 and a series of lamps 6 representing a speed scale. Lamps 4 can be of any suitable, non-dazzling light source, such as incandescent, light emitting diodes or other illuminating light source such as the ends of light guides. Lamps 6 can be positioned to define a predetermined speed difference, e.g., a difference of 10 miles per hour between adjacent lamps 6.

Although the size and location of the assembly 8 can be varied to suit the type of vehicle to which it is assembled, in one embodiment the width of speed indicating assembly 8 is at most 0.10 inch thereby accommodating a light source, such as a light emitting diode (LED), of at most 1/10 inch in diameter. In such an embodiment, the assembly 8 can be mounted onto or embedded in windshield 32 without obscuring a substantial portion of the field of vision of the operator. Of course, in such a direct mounting embodiment, it is preferable for the assembly 8 to be positioned so as to be within the peripheral vision of the operator but not centered within the normal line of sight 38 to the roadway.

As shown in FIG. 1, one of lamps 4 is illuminated. When the actual speed of the vehicle increased by one speed increment, lamp 4 will extinguish and lamp 4" will illuminate. Alternatively, if the vehicle speed decreases 3 speed increments, lamp 4 will extinguish and lamp 4' will be eliminated.

Alternatively, the non-dazzling light source can be the exit end of a light guide, such as the exit end of an optical fiber. The illumination source for the individual light guides may be of different characteristics, e.g., different color, intensity or may be pulsating or continuously illuminated, to thereby differentiate speeds which are above a predetermined speed, from other speeds or the speed scale itself. As with the lamps 4, the light guides may be mounted on or in the windshield 32.

In the most preferable embodiment, in order to maximize the unobstructed view of the driver, the speed scale can be as simple as a single point of light. This scale can be selectively illuminated so as to denote a specific speed, e.g., 35 or 55 miles per (mph). A selector (not shown) for the selective illuminator of the speed scale can be mounted in any convenient location within the operator's compartment, e.g., on the dashboard, console or steering column of an automobile. The light source identifying the actual speed of the vehicle will be automatically calibrated to account for the change in the speed scale selection.

The illuminated scale 12 and speed lamp 14 will visually appear to the operator as shown in FIG. 2 when lamp 4 of FIG. 1 is illuminated, with the remainder of speed assembly 8 being relatively invisible. This can be achieved by using transparent or translucent materials, such as certain plastics, e.g., acrylate or methacrylate, or glass for the assembly 8. As an alternative form of assembly 8 illustrated in FIG. 1 can be the use of a very thin support assembly 8', e.g., a stiff wire to support one or a series of light elements, e.g., LED's with small wires much finer than the stiff support wire, being used to carry the current to activate the light element. As shown in FIG. 5, this alternative form of assembly 8' relies on a stiff wire 50 to support speed scale lamps 6' similar to those illustrated in FIG. 1. Illumination means, such as series of lamps 5 (similar to lamps 4 of FIG. 1) are mounted and aligned in a column. This alternative assembly 8' structurally supports both the lamps 5 and speed scale lamps 6' while remaining readily yieldable. Lamps 5, 5' and 5" may be operated in a manner similar to lamps 4, 4' and 4" in FIG. 1, respectively, to impart the same visual appearance shown in FIG. 2. As only a few thousandths of an ampere is necessary to activate an LED, the small wires (not shown) can be quite thin and would not ordinarily be visible to the vehicle operator even if placed directly within his line of sight, e.g., embedded in or upon the windshield. This alternative embodiment minimizes the physical structure placed directly in an operator's line of vision. Such minimization of interference with forward vision would not impair the safety of the driver.

Because viewing of the light source indicating actual vehicle speed in comparative location to a predetermined illuminated speed scale does not require focusing of the driver's eyes on either the speed scale or the light source indicating actual vehicle speed, the display system of the present invention may be mounted in any convenient location within the driver's line of vision or within his peripheral vision.

For example, as shown in FIG. 3, the optical speed display assembly 2 may be mounted on the top of the dashboard 44 near the windshield 32, or adjacent the upper, lower or side peripheral edge of windshield 32, may extend downwardly from the roof 34, or even mounted on sunvisor 48. Placement is not critical so long as assembly 2 is directly visible or is visible by a slight sideways glance from the operator's customary line of vision 38 to the operator's focus point 40 on the roadway forming the path of the vehicle. Alternatively, as shown in FIG. 4, the optical speed display assembly 2 may be mounted on the inside surface of the windshield, in the line of sight, or to one side of the operator's normal line of sight to the roadway.

Figure 4:
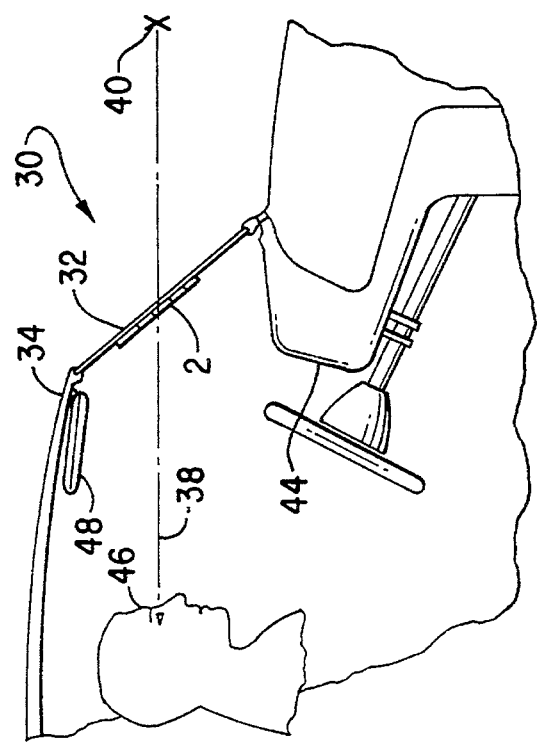
FIG. 4 is a sectional side view of the inside of a vehicle containing a display device according to a second embodiment of the invention.

As noted above, the optical speed display assembly 2 may be mounted on or into the windshield 32 (FIG. 4). Conventional adhesives and technology may be employed to facilitate such positioning.

Although the foregoing description of the invention has been made in connection with a vertical orientation of speed indicating assembly 8, it is to be understood that the orientation can be varied without departing from the scope of the invention, e.g., horizontally, other angular orientation or curved. Also the use of mph as a speed increment is not limiting but merely illustrative and other speed measurements, e.g., kilometers per hour (kph) or variables such as pressures in pounds per square inch (psi) or kilograms per square centimeter ($kg/m^2$) or temperatures in degrees Fahrenheit (°F.) or Centigrade (°C.) are also considered to be within the scope of the claimed invention.

Similarly, although the illumination device forming the speed scale and the actual speed indicating lights have been referred to as "lamps," "light emitting diodes" or "light guides," it is to be understood that each of the illumination devices of the speed scale and actual speed indicating lights may be individually varied in size, type, intensity of illumination, color, pulsating, blinking, or steady illumination so as to improve or distinguish the visual appearance without departing from the claimed invention.

In a most particularly preferred embodiment, the lights indicating the actual speed of the vehicle can be reduced to two, i.e., one at a speed in excess of the predetermined scale and one at a speed below the predetermined speed scale. In order to reduce the size of speed indicating assembly 8 to its minimum, both the scale and the actual speed indicating lamps 4 can be omitted and only a single actual speed indicating lamp can be illuminated when the actual vehicle speed exceeds the predetermined selected speed. For example, a single lamp (not shown), red in color, may illuminate every time the actual vehicle speed exceeds the predetermined, preset speed selector. In this case, the operator of the vehicle would know that the actual vehicle speed exceeds the preset selected speed limit. In this case, the red light may deluminate when the actual vehicle speed drops below the preselected speed limit or when the operator reduces the speed of the vehicle. Alternatively, a green light may be illuminated, indicating that the vehicle is operating at or below the preselected speed limit. The increment at which the aforementioned green and red lights illuminate and deluminate, respectively, can also be selected by the operator of the vehicle by utilizing a selector (not shown) of predetermined speed increment, i.e., one (1) or five (5) mph, for example.

It is thus to be expressly understood that, in its simplest form, the indicator can be a single point of light, either viewable alone, or in conjunction with a scale to impart to the operator of the vehicle meaningful information concerning the operation of the motor vehicle.

The information imparted is readable directly by the operator without the need to divert attention from the normal line of sight to the roadway forming the vehicle path or visible within the operator's peripheral vision or by a slight sideways glance.

Although the invention is particularly suitable for use at high speed and at dusk or in darkness, it is not so limited. The device may also be utilized at lower speeds, e.g., 25 mph and in the daylight. The aforementioned variation in the illumination can be increased, pulsed or made of varying color as necessary so as to assure observable visual effect.

Although the actual speed indicating lamps 4 of FIG. 1 have been indicated as being one unit, e.g., 1 mph, in spacing, the unit selected can be arbitrarily set, e.g., 2 or 5 mph.

The optical display device is low in cost and needs no new technology. It may be retrofitted to existing vehicles being used as a supplement or replacement for the original speed indicator. It may also be incorporated into newly manufactured vehicles as original equipment as a supplement or replacement for conventional speed indicators.

I claim:

1. A speed display system for use in a vehicle, intended to be operated by a sighted human operator, said operator having an optical focus point which is changeable, said display system comprising:

at least one illumination device, the illumination of which represents a speed scale, at least one illumination device distinct from the first mentioned illumination device, the illumination of which represents an actual speed of the vehicle, means to cause illumination of said speed scale and said actual speed illumination devices, said illuminated speed scale and actual speed illumination devices being mounted in said vehicle so as to be directly viewable by the operator of the vehicle when the operator's optical focus point is directed towards the path of the vehicle.

2. The speed display system of claim 1 wherein the visual appearance of the illumination of the illumination device representing the speed scale is distinct from the visual appearance of the illumination device representing the actual speed of the vehicle.

3. The speed display system of claim 2 wherein the visual appearances differ in color.

4. The speed display system of claim 2 wherein the visual appearances differ in intensity of illumination.

5. The speed display system of claim 1 wherein the vehicle is a motor vehicle having a windshield and the illuminated speed scale and illuminated actual speed illumination devices are mounted or in said windshield.

6. The speed display system of claim 1 wherein the vehicle is a motor vehicle having a windshield and the illuminated speed scale and illuminated actual speed illumination devices are mounted adjacent a periphery of the windshield.

7. The speed display system of claim 1 wherein the vehicle is a motor vehicle having a windshield and a dashboard and the illuminated speed scale and actual speed illumination devices are mounted on the dashboard extending upwardly into or near the operator's normal line of sight through the windshield to the path of the motor vehicle.

8. The speed display system of claim 1 wherein the vehicle is a motor vehicle having a windshield and a roof and the illuminated speed scale and actual speed illumination devices are mounted on the roof extending downwardly into or near the operator's normal line of sight through the windshield to the path of the motor vehicle.

9. The speed display system of claim 1 wherein the vehicle is a motor vehicle having a windshield, a roof and a dashboard and the illuminated speed scale and actual speed illumination devices span from the roof to the dashboard.

10. A speed display system for use in a vehicle intended to be operated by a sighted human operator, said operator having an optical focus point which is changeable, said system comprising means defining at least a single point of light indicating the actual vehicle speed in comparison to a preselected speed scale, said preselected speed scale comprising an illuminated scale, comprising a single point of light, said means and said illuminated scale being mounted within the field of vision of the operator's optical focus.

11. The speed display system of claim 10 wherein the means are mounted within the operator's peripheral vision.

12. The speed display system of claim 10 including means to select a preset speed.

13. The speed display system of claim 10 wherein the means defining at least a single point of light is selected from the group consisting of lamps, light emitting diodes and the exit ends of light guides.

14. The speed display system of claim 10 wherein the illuminated speed scale comprising a light source selected from the group consisting of lamps, light emitting diodes and the exit ends of light guides.

* * * * *